United States Patent Office 2,742,102
Patented Apr. 17, 1956

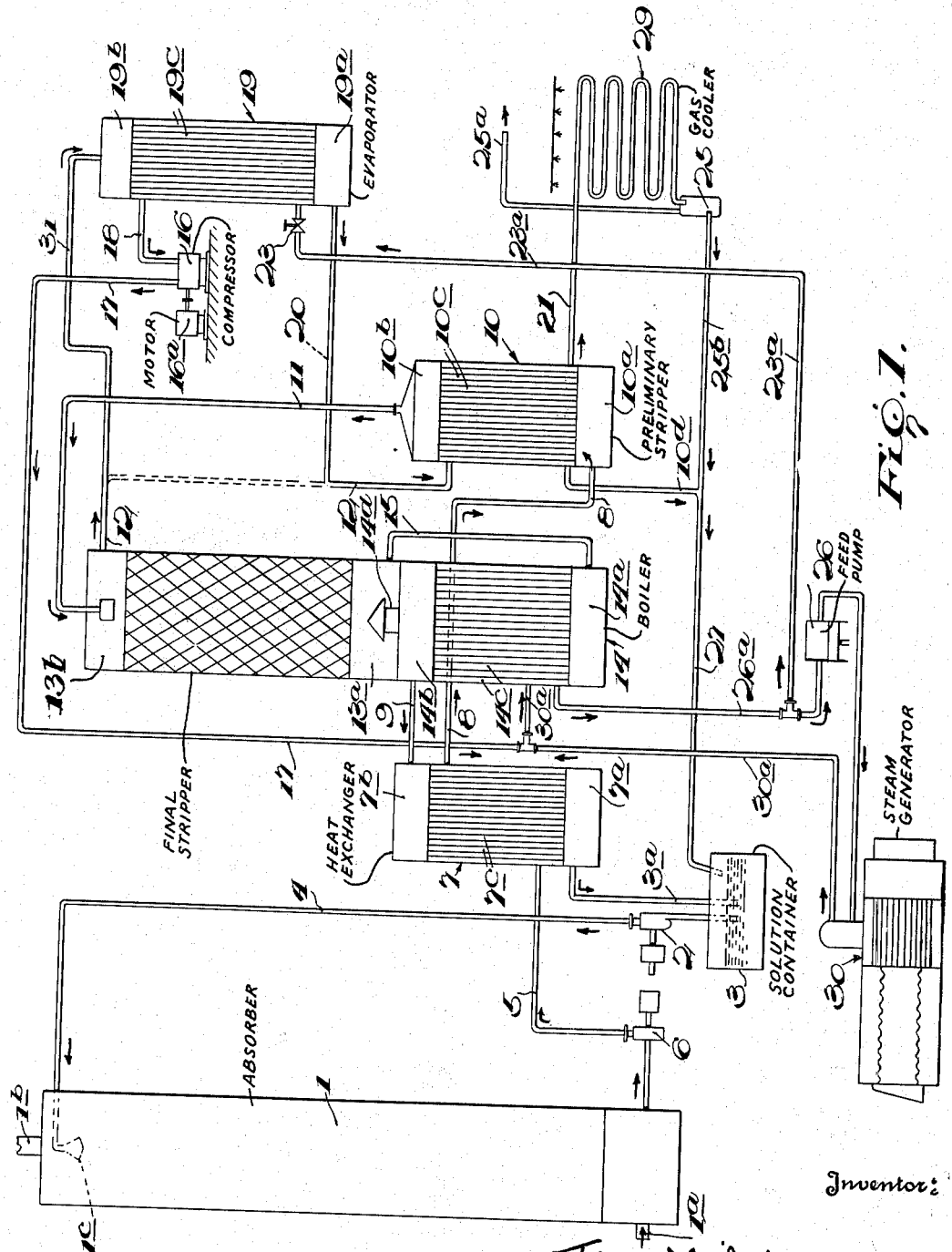

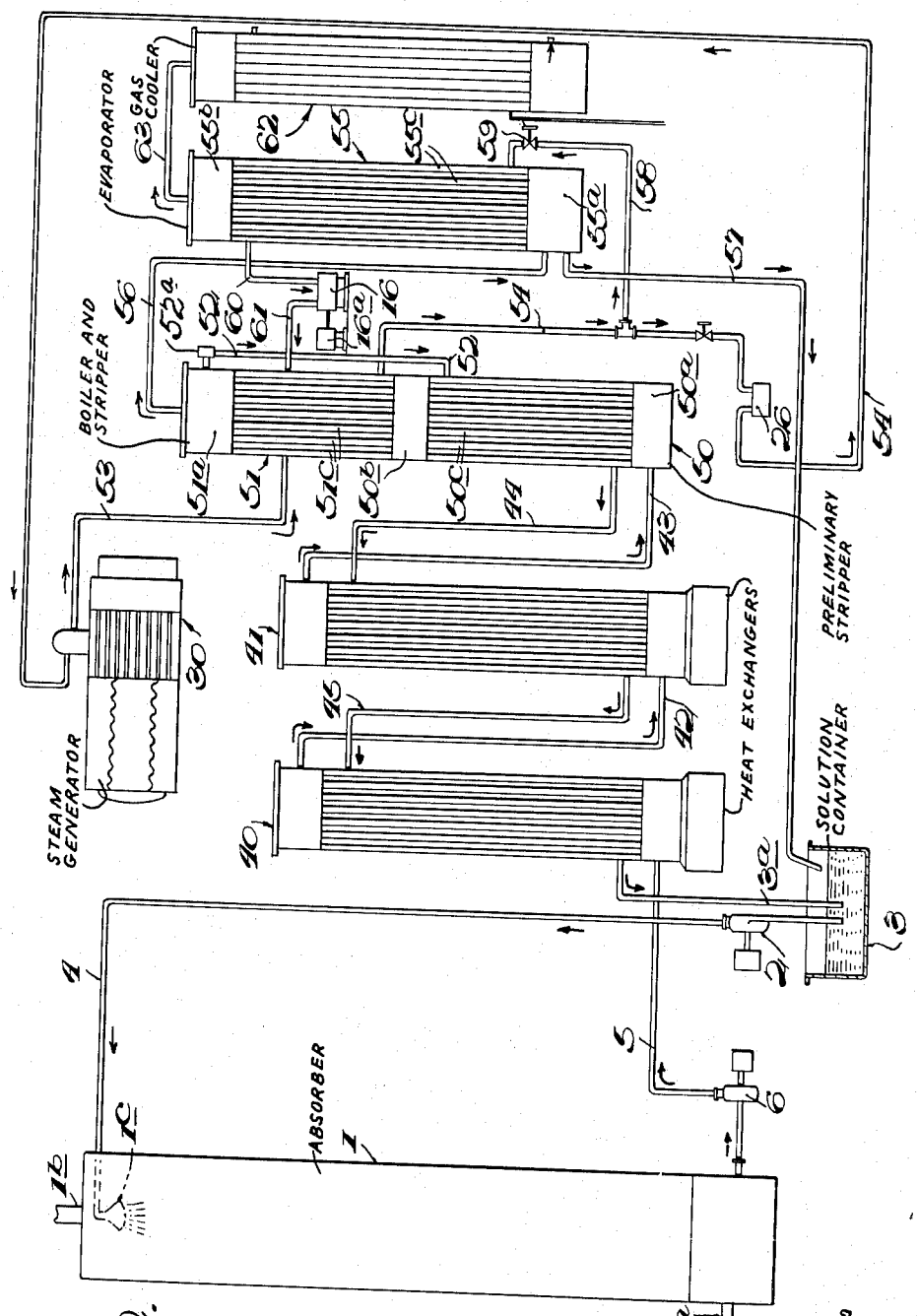

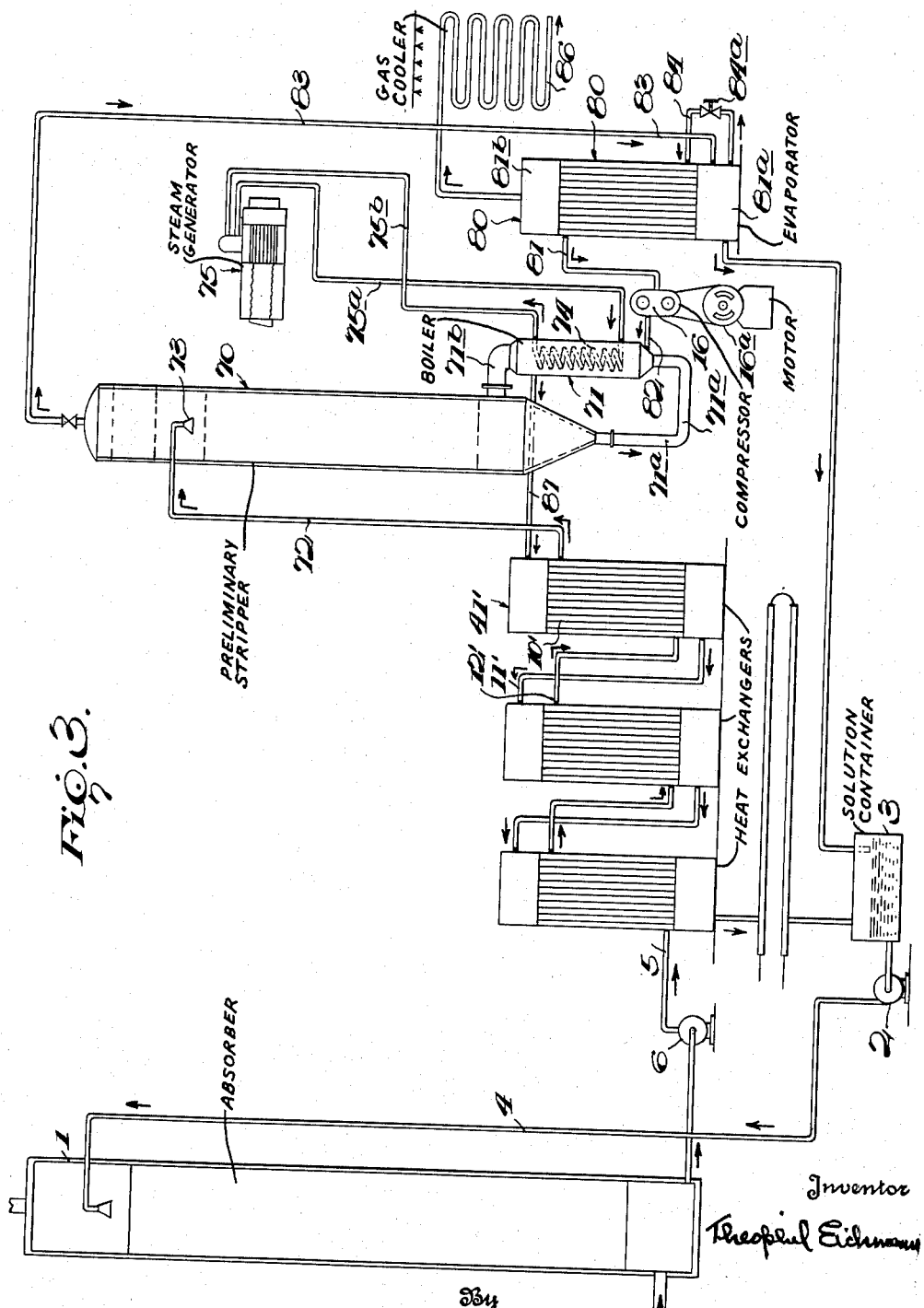

2,742,102

PROCESS AND APPARATUS FOR RECOVERING CARBON DIOXIDE FROM EXHAUST GASES

Theophil Eichmann, Bern, Switzerland, assignor, by mesne assignments, to International Carbonic Engineering Company, Wilmington, Del.

Application December 15, 1948, Serial No. 65,447

Claims priority, application Switzerland December 18, 1947

27 Claims. (Cl. 183—2)

My invention relates to methods and apparatus for recovering carbon dioxide from exhaust gases; and the nature and objects of the invention will be readily recognized by those skilled in the art involved in the light of the following explanation and detailed description of the steps and/or the sequences thereof constituting the preferred examples of the methods, and from the description and explanation of the accompanying drawings illustrating what I now consider to be the preferred embodiments or mechanical expressions of apparatus of the invention for carrying out such methods, from among various other embodiments, forms, arrangements, constructions and combinations of apparatus of which the invention is capable and adapted within the broad spirit and scope thereof, as defined by the appended claims.

Processes for recovering carbon dioxide from exhaust gases, such for example as flue gases, depend on the utilization of a suitable liquid absorbing solution, usually a solution of potassium carbonate, which has the characteristic at normal temperatures of absorbing and adding thereto carbon dioxide, and which at temperatures of approximately 100° C. has the characteristic of desorbing or liberating from the solution the pure carbon dioxide absorbed therein.

All of such processes known to me are based on the fact that the carbon dioxide saturated absorbing solution is desorbed or stripped of the absorbed carbon dioxide in a water boiler, the furnace of which supplies from the combustion of fuel therein the flue gases from which the carbon dioxide has been absorbed by the absorbing solution; or the saturated absorbing solution is desorbed or stripped in a boiler by means of steam supplied from an ordinary water boiler. Before being desorbed or stripped of its carbon dioxide, the carbon dioxide saturated absorbing solution is heated to boiling temperature by direct or indirect heat exchange.

In all such processes known to me, wherein potassium carbonate is usually utilized as the carbon dioxide absorbing solution, such solution is heated to approximately 100° C. in a steam condenser or heat exchanger for direct contact disposed above the boiler, before being desorbed or stripped of carbon dioxide in this boiler by means of live or dead steam. However, the amount of heat required for desorbing or stripping the carbon dioxide saturated solution of its carbon dioxide is so considerable that the material or fuel needed for producing the carbon dioxide does not supply by its combustion the heat required for desorbing or stripping the absorbed carbon dioxide from the saturated solution. A plant for carrying out such a process has, therefore, the disadvantage that the amount of available heat is too small, so that the yield of carbon dioxide from such a process is decreased and low.

With other processes, for instance when utilizing the flue gases from lime burning, no waste heat is available for the direct generation of steam. Hence, additional combustion material is required for desorbing or stripping the solution of its absorbed carbon dioxide, so that the economy of a plant using such processes is considerably impaired or lowered. Thus, every carbon dioxide plant includes and presents a heat recovery problem, the correct solution of which effects the efficiency and economy of the plant.

A primary and general object of my present invention is the substantial elimination or the reduction in the effects, of the above referred to disadvantages of all such known processes.

Another object is to recover the heat supplied to the steam-carbon dioxide mixture which is produced in the final boiling and utilize such recovered heat in the recovery process.

Another object is to recover through the medium of a heat pump the heat supplied to the steam-carbon dioxide mixture which is produced in the final boiling of the carbon dioxide saturated absorbing solution.

A further object is to provide a process which may be utilized for the recovery of carbon dioxide from exhaust gases through the absorption of the carbon dioxide by means of a liquid absorbing solution, in which process the carbon dioxide saturated absorbing solution supplied by the absorbing plant and before the desorption or stripping of the absorbed carbon dioxide from the solution, is first heated by heat exchange to a temperature approaching as closely as possible to the boiling point temperature of the solution.

A further object is to provide such a process in which the final boiling to effect final desorption or stripping is performed in a boiler which is heated by a heat pump so arranged that the amount of heat which is supplied to the steam-carbon dioxide mixture produced in the final boiling will be recovered and utilized in carrying on the process.

I have shown, more or less schematically, in the accompanying drawings several forms and arrangements of plants for carrying out the processes of my invention, in which drawings Fig. 1 discloses a preferred arrangement of plant of the invention; Fig. 2 discloses another arrangement of plant in which the final boiler is located above the preliminary stripper; and Fig. 3 discloses a modified arrangement of plant in which the final boiler is located below the preliminary stripper.

As one example, a process in accordance with my invention may be performed by carrying out the following basic procedure and steps:

A carbon dioxide saturated absorbing solution, which may be a water solution of potassium carbonate supplied by a suitable absorbing plant, is heated in a heat exchanger or heat exchangers to a temperature of the order of 80° to 85° C. This preheated absorbing solution is then further heated in a preliminary stripper or steam condenser to a temperature corresponding approximately to the boiling point of the solution, before the solution is stripped in the stripper and finally boiled in a suitable solution or lye boiler. By this procedure, no heating takes place in the stripper, so that, the steam leaving the boiler, except the heat of desorption, is made available for heating in the preliminary stripper or steam condenser. In this instance, the partial pressure of the carbon dioxide is much smaller due to the increased amount of steam and vapor pressure.

The carbon dioxide absorbing solution can thus be better stripped and regenerated and the degree or extent of absorption will be increased. The heat consumption, when heating the absorbing solution or lye in the steam condenser or preliminary stripper, is not sufficient to condense all of the vapors of the steam-carbon dioxide mixture, and a considerable amount of vapor will thus be available for utilization by a heat pump organization, which heat pump may be interposed or connected into a plant for carrying out the process either before or after the steam condenser or preliminary stripper.

In the foregoing manner, the major portion of the necessary vapor may be recovered which permits of a considerable reduction in the amount of additional live steam required. Hence the thermal efficiency of the plant will be increased. For example, with an absorbing solution such as potash lye, approximately twenty (20) grams of carbon dioxide are recovered per liter from the circulating solution. For a recovery plant having a production of 200 kg./h., ten thousand (10,000) liters or 10 m.$^3$ are required in circulation, and, therefore, heating to a temperature of the order of approximately 85° C. to 95° C. requires one hundred thousand (100,000) cal./h. A production of two hundred (200) kg. of carbon dioxide with my present process is obtained with an economy or saving of one hundred thousand (100,000) cal./h., which corresponds to an economy or saving of two hundred (200) kg. of steam/h. A plant operated according to a usual process requires one hundred (100) kg. of steam per two hundred (200) kg. of carbon dioxide, so that, the economy or saving effected by a process of my present invention is of the order of twenty percent (20%). Then by adding and utilizing in the process a heat pump in accordance with my invention, a further economy or saving of the order of approximately twenty percent (20%) to fifty percent (50%), depending upon the capacity of the plant, is possible. This is a very important saving in those carbon dioxide plants where no steam, or only a small amount of steam, is available, as for example, with processes for the recovery of carbon dioxide from natural or coke-oven gas, or by burning limestone.

In Fig. 1 of the drawings one form of preferred plant arrangement is disclosed for carrying out a recovery process in accordance with my invention. In this Fig. 1 arrangement, an absorbing tower 1 is provided, which may be considered to be of more or less conventional form familiar in the art. The tower 1 is charged or packed with a suitable packing such as coke or the like (not shown) and the flue or exhaust gases are fed in the usual manner into the lower end of tower 1 below the packing, as by an exhaust gas supply line 1a from any suitable source of flue or exhaust gas supply. The flue gas from which carbon dioxide has been absorbed in the tower 1 may be discharged therefrom by means of an outlet 1b in the upper end of the tower. The tower 1 has absorbing solution, such as a so-called lye forming solution of water and potassium carbonate, discharged thereinto at the upper end thereof above the packing by means of a discharge or spray head or heads 1c supplied with solution from a solution container 3 through pipe 4 by means of an absorbing solution pump 2.

Thus, the absorbing solution flows downwardly through tower 1 counter-current to the flow of exhaust gases passing upwardly through the tower, so that, the absorbing solution absorbs from the exhaust gases carbon dioxide. The carbon dioxide saturated solution (that is, absorbing solution rich in carbon dioxide) collects and is received in the lower end of the absorbing tower 1 below the packing therein.

A heat exchanger 7 is provided, which may be taken to be of generally conventional design, and which includes a lower header 7a, an upper header 7b and a series of tubes 7c connecting these headers and extending through the enclosed space therebetween. The tube enclosing space of heat exchanger 7 is supplied with saturated absorbing solution from the absorbing tower 1 by a pump 6 and a pipe line 5. The lower header 7a of heat exchanger 7 discharges into the solution container 3 through a pipe 3a.

A preliminary stripper or condenser 10 consisting of a lower header 10a, an upper header 10b and a series of tubes 10c connecting these headers and extending through the enclosed space therebetween, has the lower header 10a thereof connected with the tube enclosing space of heat exchanger 7 by a pipe 8 for supplying saturated solution preheated in heat exchanger 7 to the lower header 10a. The upper header 10b of the preliminary stripper 10 is in communication with and discharges into the upper header 13b of a final stripper 13, by means of a pipe 11. The tube enclosing space of preliminary stripper 10 which is in heat exchange relation with the tubes 10c therein, has the lower portion thereof connected by a pipe 10d into a pipe line 27 which leads back to the solution container 3. The upper portion of such tube enclosing space of preliminary stripper or condenser 10, is connected with the upper header 13b of final stripper 13 by a pipe line 12.

The final stripper 13 is, in the arrangement of this example, positioned over and mounted on boiler 14 in upward continuation of the boiler. The stripper 13 includes a lower header 13a which is in communication with the upper header 14b of boiler 14 through a hooded tube 14d.

The boiler 14 includes a lower header 14a and a series of tubes 14c connecting this lower header with the upper header 14b thereof, these tubes extending through the enclosed steam receiving space between such headers. Upper header 7b is connected with the upper header 14b of boiler 14 by a pipe 9, while the lower header 13a of final stripper 13 is connected with the lower header 14a of boiler 14 by pipe line 15.

The boiler 14 is provided with live steam from a water boiler or steam generator 30 by means of a steam line 30a which discharges through the tube enclosing space in boiler 14, while water of condensation is returned from the tube enclosing space of the boiler to the steam generator 30 by means of a pipe line 26a in which there is connected a condensate return pump 26. Thus, live steam is supplied in a closed circuit from steam generator 30 to the tube enclosing space of boiler 14 in heat exchange relation through the walls of the tubes 14c with fluid passing upwardly through these tubes from lower header 14a to upper header 14b of boiler 14.

A water cooled cooler or condenser 29 is provided which receives the carbon dioxide gas and vapor stripped from the saturated solution by the preliminary stripper 10 and the final stripper 13, through a pipe 21 which is connected with the lower end of the tube enclosing space of the preliminary stripper. The cooler 29 discharges into a gas separator or trap 25, in which the vaporized liquid which has been condensed in the cooler is separated out from the carbon dioxide gas. Such gas is discharged from trap 25 to a suitable point of recovery, by the pipe line 25a. The condensate separated out in trap 25 is discharged by pipe line 25b into the pipe line 27 with which it is connected for return thereof to the solution container 3 for recycling.

The plant arrangement of Fig. 1 of the invention, includes the provision of a heat pump organization which comprises a heat pump 16, preferably in the form of a rotary compressor driven by a motor or other source of power 16a, and an evaporator 19. The evaporator 19 may be of a construction to include a lower header 19a, an upper header 19b, and a series of tubes 19c connecting and in communication with said headers and being extended through the enclosed space between the headers. In this instance, the lower portion of the tube enclosing space of evaporator 19 is connected with a condensate return line 26a from boiler 14 by a pipe line 23a which is connected into the line 26a. A regulating valve 23 is provided in the line 23a adjacent the point of connection of that line into the tube enclosing space of the evaporator. The upper portion of the tube enclosing space of evaporator 19 is placed in communication with the suction or intake side of compressor 16 by a pipe 18, while the discharge or delivery side of compressor 16 is connected with the live steam supply line from the steam generator 30 by a pipe line 17.

The lower header 19a of evaporator 19 is connected and placed in communication with the line 12 from stripper 13, by a pipe line 20, while the upper header 19b is also connected with line 12 by pipe 31.

With the plant arrangement of Fig. 1, a carbon dioxide recovery process in accordance with my invention may be performed as follows:

Carbon dioxide saturated absorbing solution, say a solution of potassium carbonate, is fed from absorbing tower 1 by pump 6 through pipe 5 into the tube enclosing space in the heat exchanger 7. This solution may be delivered to the heat exchanger at a temperature of the approximate order of 30° C. The saturated solution, after heat exchange with stripped solution which passes downwardly through the tubes 7c, is discharged from heat exchanger 7 by pipe 8 to the lower header 10a of the preliminary stripper or condenser 10. The temperature of the saturated solution delivered from the heat exchanger may be of the order of approximately 75° C. to 80° C.

In the preliminary stripper or condenser 10 this preheated saturated solution passes upwardly through the tubes 10c in heat exchange relation with the mixture of carbon dioxide and steam which is discharged from the final stripper 13 by a pipe 12 into the tube enclosing space of the preliminary stripper or condenser 10. The pre-heated, saturated solution has its temperature raised in condenser 10 to the order of approximately 95° C. to 100° C. At this temperature there is a liberation or desorbing of some carbon dioxide, and the resulting solution mixture with traces of liberated carbon dioxide is discharged from the header 10b of the preliminary stripper or condenser 10 by the pipe 11 into the upper header 13b of final stripper 13. The solution passes downwardly through stripper 13 into the lower header 13a thereof, and from this lower header into the lower header 14a of boiler 14 by means of pipe 15.

The boiler 14 is supplied with live steam from both the water boiler or generator 30 through the pipe line 30a, and also from the heat pump compressor 16 through the pipe line 17. In the boiler 14 the solution is heated and boiled by direct or indirect contact and heat exchange, in this example by heat exchange through the walls of the boiler tubes 14c. Thus, carbon dioxide gas is desorbed or stripped and liberated from the solution and this gas with the generated steam vapor is delivered into the lower header 13a of stripper 13 from the upper header 14b of the boiler through the hooded tube or flue 14d. In the stripper 13 a further liberation of carbon dioxide gas takes place, so that, the ratio of carbon dioxide to steam may amount to the order of approximately 1:5.

This mixture of carbon dioxide and steam vapor is circulated through pipe 12 to the tube space in the preliminary stripper or condenser 10, in which, according to the temperature of the solution or lye at the outlet, the condensed steam or vapor will amount to the order of approximately 200 to 300 kg. The remaining approximately 700 kg. of steam are used to evaporate the water injected by regulating valve 23 into the evaporator 19 of the heat pump organization.

The vapors resulting from the evaporation of the water by the 700 kg. of steam in evaporator 19, are sucked or drawn off at low pressure from the tube enclosing space through the pipe 17 by the heat pump 16. The compressed vapors are then discharged by the compressor 16 into the boiler 14 through the pipe 17, where the heat is utilized in effecting the final boiling of the absorbing solution to effect final stripping of the carbon dioxide gas therefrom. Thus, the heat recovered by the heat pump organization and utilized in effecting boiling, results in a considerable economy or saving in the total steam required, so that, the power consumption of the heat pump organization may be correspondingly lower.

The heat pump organization, which includes the power driven compressor 16 of this example and which is utilized for further increasing the thermal efficiency of the recovery operation, supplies the heat necessary for evaporating the condensate water in the evaporator 19 from the valve 23. From the carbon dioxide-steam mixture in the evaporator 19, depending upon the dimension of the heat pump compressor 16, a larger or smaller amount of vapor is condensed and then the mixture with its resulting decreased vapor content passes through the pipe 20 to preliminary stripper 10. On the other hand the pipe 20 may by-pass the preliminary stripper and connect directly into the pipe 21. In such a construction, the mixture may flow from the evaporator through pipe 21 to condenser 19 to the gas cooler 29 directly after passing through the preliminary stripper. If the heat pump is branched before the condenser or preliminary stripper 10, as indicated in the example of Fig. 1, it will generate 8000 cal. for each kw. of electrical energy, while if branched after the condenser it will generate 5000 cal. per kw.

The mixture of steam and carbon dioxide gas which is delivered to the preliminary stripper or condenser 10 by pipe 12 from stripper 13 after passing downwardly through the tube enclosing space in condenser 10 and giving up heat to the saturated solution passing upwardly through tubes 10c is delivered through pipe 21 to the gas cooler 29. In the gas cooler 29 the steam will be condensed and the carbon dioxide gas will be cooled. The condensed water is separated out in a separator 25 and flows back to the solution container 3 through pipe 27, while the cooled gas is discharged through the pipe 25a.

The live steam furnished by the boiler 30 and utilized to boil the solution in the boiler 14 through indirect heating through the walls of tubes 14c, will yield in the boiler a certain amount of condensing water which is returned back to the boiler 30 through the line 26a by the feeding pump 26.

In accordance with my invention, the preheating in the heat exchanger 7 of the saturated solution prior to the delivery thereof to the preliminary stripper 10, the stripper 13 and the boiler 14, is effected through the medium of the heated and stripped solution from the upper header 14b of boiler 14. This stripped solution is discharged from header 14b by pipe 9 into the upper header 7b of the heat exchanger 7, at a temperature of the order of approximately 102° C. The solution at such order of temperature then flows downwardly through tube 7c of heat exchanger 7 in heat exchange relation through the tube walls with the carbon dioxide saturated absorbing solution delivered to the tube enclosing space by the pipe 5. From the lower header 7a the stripped solution, then reduced in temperature by such heat exchange to a temperature of the order of approximately 55° C. is discharged through pipe 3a into the solution container 3 for recirculation and recycling through the plant.

In Fig. 2 of the drawings I have schematically shown another plant arrangement of my invention in which the boiler for stripping or desorbing the saturated solution is located above the preliminary stripper, and in which the heat pump organization is branched or connected into the system after or in effect to by-pass the preliminary stripper.

In the arrangement of Fig. 2, a plurality of heat exchangers, such as exchangers 40 and 41, are provided for pre-heating the saturated solution by heat exchange with the heated, stripped solution, in the same general manner as described in connection with the plant of Fig. 1. Heat exchangers 40 and 41 may be considered to be of the general construction of the heat exchanger 7 of Fig. 1. Saturated solution is delivered to heat exchanger 40 by pipe 5 and from this heat exchanger to the exchanger 41 by the pipe 42, while pipe 43 delivers the preheated solution from exchanger 41 to the lower header of the preliminary stripper 50. Stripped solution from the preliminary stripper 50 is delivered to the tube enclosing space of exchanger 41 by pipe 44 and from exchanger 41 to exchanger 40 by pipe 45. This stripped solution is then discharged from exchanger 40 by pipe 3a into the solution container 3.

The preliminary stripper 50 may be considered to be of the same general construction as stripper or condenser 10 of the Fig. 1 plant, and includes a lower header 50a, an upper header 50b and a series of tubes 50c extending between and placing these headers in communication. The pipe 43 delivers the pre-heated saturated solution from exchanger 41 to the lower header 50a of preliminary striper 50, while the heated and stripped solution is delivered by pipe 44 from the tube enclosing space in stripper 50 to the tube enclosing space of the heat exchanger 41.

The boiler and final stripper 51 is mounted and positioned above, in continuation of and as in effect a unit with the preliminary stripper 50. Boiler 51 comprises an upper header 51a, a lower header constituted by the upper header 50b of stripper 50 and a series of tubes 51c extending between and placing headers 51a and 50b in communication. The upper header 51a of boiler 51 is connected with the upper end of the tube enclosing space of stripper 50 by pipe 52. A suitable separator 52a may, if found desirable, be included to minimize flow of carbon dioxide and water vapor through pipe 52.

An auxiliary water boiler or steam generator 30 is provided for supplying additional live steam to boiler 51 by pipe 53, which live steam supply pipe discharges into the tube enclosing space of the boiler. A return line 54 is provided from the lower end of the tube enclosing space of boiler 51 back to the steam generator 30. A return flow pump 26 is provided in the line 54.

A heat pump organization generally similar to that described in connection with Fig. 1, is included in the plant of Fig. 2 and comprises the rotary compressor 16 driven by the motor or other power source 16a and the evaporator 55. Evaporator 55 is generally similar in construction to that of the evaporator 19 of Fig. 1, and includes a lower header 55a, an upper header 55b and a series of tubes 55c connecting these headers and extending through the enclosed space therebetween.

In this instance, the heat pump organization is branched or connected into the system after that is to say by-passes the preliminary stripper 50. The lower header 55a of evaporator 55 is connected with and receives the mixture of steam and carbon dioxide from upper header 51a of boiler 51 by a pipe line 56. Condensate from the lower header 55a of evaporator 55 is returned to the solution container 3 by the pipeline 57. The tube enclosing space of the evaporator 55 is supplied with condensed steam from the boiler 51 through the pipe 54 and the pipe 53 connected therewith which leads to and discharges into the evaporator through a regulating valve 59. The suction or intake side of compressor 16 is connected with the upper end of the tube enclosing space of evaporator 19 by a pipe 60, while the pressure or discharge side of the compressor is connected with and discharges into the tube enclosing space of boiler 51 by a pipe 61.

The upper header 55b of the evaporator 59 which receives the pure carbon dioxide gas liberated from the steam-carbon dioxide mixture delivered to the evaporator, is delivered from this header to a suitable cooler 62, which may be of the water cooled type, by means of a pipe 63.

With the plant arrangement of Fig. 2, a carbon dioxide recovery process in accordance with my invention is performed as follows:

The carbon dioxide saturated solution from the absorbing tower after passing through the heat exchangers in heat exchange relation with the stripped solution, is discharged from the heat exchanger 41 into the lower header 50a of the preliminary stripper 50 at a temperature which may be of the order of approximately 75° C. to 80° C.

The preheated solution is then circulated upwardly through stripper 50 in heat exchange relation with solution which has been boiled and stripped and which has been discharged from boiler 51 through the pipe 52 into the tube enclosing space of the stripper. The saturated solution is heated in stripper 50 by this heat exchange to a temperature of the order of approximately 100° C. By this heating there takes place in stripper 50 a preliminary stripping or liberation of carbon dioxide gas from the saturated solution.

The preliminarily stripped solution then flows from header 50b of the stripper, through tubes 51c of the final boiler 51, in which boiler the solution is boiled by means of the evaporating heat recovered by the heat pump organization and additional live steam from the auxiliary water boiler or steam generator 30. The stripped solution then flows to and through stripper 50 into the heat exchangers 41 and 40 back to the solution container 3.

The mixture resulting in the upper header 51a of the boiler 51 will be comprised of carbon dioxide gas and vaporized water content from the absorbing solution, in this instance the potassium carbonate solution. The proportions of the mixture are of the order of 200 kg. of carbon dioxide to 1,000 kg. of steam, with a temperature which may be of the order of 104° C. and a pressure of the order of 1.15 atmospheres absolute.

This mixture from boiler 51 discharges into the lower header 55a of the heat pump evaporator 55, through pipe 56. From header 55a the mixture circulates upwardly into the tubes 55c where the steam is condensed out and separated from the carbon dioxide gas. The separated gas flows by way of pipe 63 from evaporator 55 into and through the water cooled cooler 62, and the condensed steam is returned from the lower header 55a to the solution container 3 through the pipe 57.

The evaporator 55 is fed with the condensed steam from the boiler 51 through pipe 58 to the expansion or regulating valve 59, through which valve it is discharged into the evaporator in heat exchange relation through the walls of the tubes 55c with the mixture of carbon dioxide gas and steam which circulates through these tubes.

Thus, as in the case of the heat pump organization of the plant of Fig. 1, the evaporator 55 acts as a condenser of the vapors generated in the boiler 51, so that, on the one side in the evaporator 55 the vapors arriving from boiler 51 will be condensed and the condensate returned back to solution container 3, whereas, on the other contact side of the evaporator the condensate arriving from the boiler will be evaporated.

The heat of condensation set free by the condensating side of the evaporator 55, is used to evaporate water and the generated steam is sucked or drawn from the evaporator 55 through the pipe 60 by the rotary compressor 16 of the heat pump organization. The compressor compresses such steam to a pressure corresponding to a temperature of saturation of the order of approximately 115° C., and such compressed steam is then discharged through pipe 61 into the boiler 51 where it effects the final boiling of the partially stripped carbon dioxide saturated solution delivered to the boiler from the preliminary stripper 50.

As an example, the mixture of steam and gaseous carbon dioxide delivered to the evaporator 55 from the boiler 51 through the pipe 56, may be in the proportions of the order 200 kg. of carbon dioxide and 1,000 kg. of steam at a temperature of the order of 104° C. and a pressure of the order of approximately 1.15 atmospheres. This mixture when it reaches the upper end of the evaporator may be in the proportions of the order of 200 kg. of carbon dioxide gas and 500 kg. of steam with the mixture having a temperature of the order of approximately 85° C. and a pressure of the order of approximately 1.15 atmospheres, but with the partial pressure of the steam of the order of approximately 0.6 atmosphere.

Thus, the heat of condensation of approximately 500 kg. of steam of the mixture delivered to the evaporator 55 is utilized to evaporate approximately 500 kg. of water around the evaporator tubes 55c with the resulting steam drawn off by the compressor 16. And, in this connection, it is advisable to have the suction pressure of the compressor at a pressure approximately 0.1 atmosphere below the partial pressure of the steam at the upper end of the evaporator 55 in order to obtain a sufficient drop in heat. Hence, in the example hereof, the suction pressure of the compressor may be considered to be of the order of approximately 0.5 atmosphere. This steam is then recompressed in the compressor back up to a pressure of the order of approximately 1.15 atmospheres.

In this manner the above mentioned heat of condensation of approximately 500 kg. of steam and the heat of compression generated by the compressor 16, are utilized to furnish heat to the boiler 51, together with the necessary additional steam fed to boiler 51 from the auxiliary boiler 30 to furnish the total heat required for effecting the operation of the final boiling of the partially stripped absorbing solution delivered to boiler 51 in order to strip the remaining carbon dioxide from the solution.

In Fig. 3 of the drawings I have schematically shown a plant arrangement in which the preliminary stripper 70 is located above the final boiler 71 and direct heating of the saturated solution or lye, such as a potassium carbonate solution, is effected with the heat pump organization.

The Fig. 3 plant arrangement is generally similar to that hereinbefore described in connection with Fig. 2 through the preheating, heat exchangers, except that an additional heat exchanger 41' is provided.

Preliminary stripper 70 is provided in the form of an elongated tank or tower which receives in the upper portion thereof the pre-heated saturated absorbing solution from the heat exchanger 41' through a pipe 72 having at its discharge end within the upper end portion of stripper 70, a discharge or supply head 73.

A final boiler 71 is provided for effecting desorption or stripping of the carbon dioxide gas content from the saturated solution. This boiler 71, in this instance, takes the form of a cylindrical body in which there is mounted a heating coil 74. This coil 74 may, as in the example hereof, be in the form of a steam coil for receiving live steam from the auxiliary boiler or steam generator 75. However, attention is here directed to the fact that my invention contemplates and includes the substitution for the steam coil 74, of an electrical heating unit which may be supplied with electrical energy from any suitable source. In the event of such substitution the electrical energy source takes the place of the auxiliary boiler or steam generator 75.

The final boiler 71 has the lower or intake end thereof placed in communication with the stripper 70 by a conduit 71a, while the upper or discharge end of the boiler is placed in communication with the stripper 70 by a pipe or conduit 71b which discharges into the stripper at a location above the lower end thereof. Thus, boiler 71 is placed in a closed circuit with stripper 70 for circulation of saturated solution through the boiler to raise the solution by direct heat contact to the boiling temperature for the purpose of effecting the desorbing or stripping of the carbon dioxide content from this solution.

The steam coil heating element 74 of the boiler 71 is connected with the auxiliary boiler 75 by the pipes 75a and 75b which provide for closed circulation of live steam from boiler 75 through the heating coil 74 and back to the boiler.

In accordance with the invention, a heat pump organization such as hereinbefore described and explained, is included in the plant arrangement of Fig. 3. In this instance, the heat pump organization includes a rotary compressor 16 driven by a suitable source of power such as motor 16a, and an evaporator 80. The evaporator 80 is of the general type of heat pump evaporators 19 and 55 as hereinbefore described. The suction or intake side of the compressor 16 is connected by a pipe 81 to the upper end of the tube enclosing space of evaporator 80 and thus draws or sucks from the evaporator the vapors resulting from the evaporation therein of the water delivered thereto. These withdrawn vapors are received in the compressor and discharged therefrom through pipe 82 into the lower end of the boiler 71 into direct contact with the solution circulating through the boiler.

The lower header 81a of heat pump evaporator 80 receives the mixture of steam or vapor and carbon dioxide gas from the upper end of the stripper 70 through a pipe line 83. The lower end of the tube enclosing space within evaporator 80 has discharged thereinto through pipe line 84 and regulating valve 84a, condensed steam for evaporation therein to recover the heat of condensation.

The upper header 81b of the heat pump evaporator 80 receives therein the carbon dioxide gas and vapor which is passed through the evaporator, and the carbon dioxide gas is then passed through a water cooled cooler 86 in the general manner hereinbefore described in connection with the plant arrangement of Figs. 1 and 2. In the stripper 70 the carbon dioxide gas is desorbed or stripped from the absorbing solution which is discharged thereinto by pipe 72, and the resulting mixture of steam or vapor and carbon dioxide gas is led to the evaporator 80 by the pipe 83. The heated and stripped solution is returned from the upper end of boiler 71 to the upper header of the heat exchanger 41' by a pipe 87. If desired a suitable separating means (as in the case of separator 52a in Figure 2 may be inserted where pipe 87 takes off from boiler 71, so as to minimize flow of carbon dioxide and water vapor through said pipe. This heated and stripped solution flows through the heat exchangers in heat exchange relation with the saturated solution and is then returned to the solution container 3.

It is to be noted that by the arrangement of Fig. 3, with the stripper 70 located above boiler 71, there is the advantage that heating of the boiler by direct steam, and of course also by indirect steam from the steam boiler or heat pump, is possible.

By the foregoing methods and plant arrangements, the carbon dioxide saturated absorbing solution is first heated before final boiling to a temperature of approximately the order of 95° C. to 100° C., that is as near the boiling temperature as possible, by heat exchange with heated solution from which the carbon dioxide has been desorbed and stripped, so that heat is recovered from the stripped solution and thus is utilized to increase plant efficiency. This pre-heated saturated solution is then boiled by utilizing heat recovered from the steam-carbon dioxide mixture generated by such boiling, after which the steam-carbon dioxide mixture may be conducted to a condenser where the steam constituent will be condensed out and the carbon dioxide gas separated and liberated therefrom. By this condensation step, water is evaporated at about 85° C. on the evaporating side of a heat pump and is brought to a temperature of saturation of about 115° C. by compression in the rotary compressor of the heat pump. By means of these vapors there is obtained a desorbing or stripping of the carbon dioxide gas from the saturated solution. Attention is directed to the fact that the more of the saturated solution that is stripped of carbon dioxide, the more heat which becomes again available in the heat pump, so that, only the energy required for driving the rotary compressor of the pump need be supplied. However, the heat loss of a plant in which processes of the invention may be carried out, must be covered and compensated for, so that, additional heat that may be required to raise the solution to and maintain it at boiling temperature, that is to a temperature of the approximate order of 102° C. to 105° C., by either dead or live steam may be required and, as in the example shown, is furnished by the auxiliary water boiler or steam generator. But this additional heat will amount to only about one-tenth (1/10) of the total heat consumption.

While in the above examples of plant arrangements and processes of my invention, the absorbing solution indicated as being a water solution of potassium carbonate, it is to be understood that my inventions are not limited or restricted to the use of such absorbing solution. For example, water solutions of alkali phenolates, of alkali salts of the dimethyl glycine or of the methylalanine, or water solutions of glycine potassium, glycine sodium, of alanine potassium or sodium, of mono-, di-, and triethanolamine, mono-, di-, and tripropanolamine, of diethylene glycol or of mixtures of such products, may be utilized.

It is also understood that various changes, modifications, variations, substitutions, eliminations and additions might be resorted to in either apparatus or process, without departing from the spirit and scope of my invention, and hence, I do not wish to limit myself in all respects to the exact and specific disclosures hereof.

What I claim is:

1. In apparatus for recovering carbon dioxide from a carbon dioxide saturated absorbing solution, in combination, a boiler for boiling therein the carbon dioxide saturated solution to desorb the carbon dioxide therefrom; a heat pump organization comprising a power driven compressor having a suction intake and a pressure discharge therefrom, and an evaporator; said evaporator being connected with said boiler for receiving condensate for evaporation therein, said evaporator being also connected with the suction intake of said compressor for withdrawal and compression of the evaporated steam condensate; said boiler being connected with the pressure discharge of said compressor for receiving therefrom compressed evaporation vapors; and said evaporator being connected with and receiving from said boiler carbon dioxide-steam mixture for passage therethrough in heat exchange relation with condensate received and being evaporated in said evaporator.

2. In apparatus for recovering carbon dioxide from a carbon dioxide saturated absorbing solution, in combination, a steam boiler for boiling therein the saturated solution to desorb therefrom the carbon dioxide; a preliminary stripper connected with said boiler for receiving therefrom stripped solution and for receiving the mixture of carbon dioxide-steam vapor from the boiler for heat exchange with said saturated solution; a heat pump organization comprising, a power driven compressor having a suction intake and a pressure discharge therefrom, and an evaporator; said evaporator being connected for receiving steam condensate from said boiler for evaporation therein and the suction intake of said compressor being connected with said evaporator for drawing the evaporated condensate therefrom; and connections to said evaporator for discharging thereinto the carbon dioxide steam vapor mixture evolved from the saturated solution in said boiler for heat exchange with the evaporated condensate in the evaporator to condense out the steam vapor content of said mixture.

3. In apparatus for recovering carbon dioxide from a carbon dioxide saturated absorbing solution, in combination, a saturated solution boiler of the steam-heated type for boiling therein the saturated solution to desorb therefrom the carbon dioxide; a final stripper mounted above said boiler for receiving therefrom boiled solution and the mixture of carbon dioxide and steam vapor evolved from such boiling; a preliminary stripper adapted to receive carbon dioxide saturated solution and to discharge such solution in preheated condition into said final stripper above said boiler; a pipe line connecting the lower end of said final stripper with said boiler for returning to the latter boiled solution from the stripper; a heat pump organization comprising a compressor having a suction intake and a pressure discharge, and an evaporator connected with the compressor suction intake; a supply line connecting said boiler with said evaporator for supplying to the latter steam condensate for evaporation therein; and said heat pump evaporator being connected with and receiving carbon dioxide-steam vapor mixture from said final stripper and for passing said mixture in heat exchange relation with the evaporating steam condensate in said evaporator to condense out from the mixture the steam vapor therein.

4. In apparatus for recovering carbon dioxide from a carbon dioxide saturated absorbing solution, in combination, a solution stripper adapted to receive carbon dioxide saturated solution to be stripped; a boiler having its intake connected with the lower end of said stripper and its offtake connected with said stripper above said intake and including a heating unit therein for raising the temperature of the solution circulating therethrough to a temperature corresponding to the boiling point of said solution for desorption of carbon dioxide therefrom; a heat pump organization comprising a power driven compressor having a suction intake and a pressure discharge, and an evaporator connected with the compressor suction intake, said heat pump evaporator adapted to receive condensate from said boiler and stripper for evaporation thereof in said evaporator and circulation of the evaporated condensate to said compressor, said compressor having the discharge therefrom connected to said boiler for discharge into the latter the compressed evaporated condensate from said evaporator; and said stripper being connected with said evaporator and discharging thereinto carbon dioxide-steam vapor mixture from said stripper for circulation through the evaporator in heat exchange relation with the condensate being evaporated therein.

5. In a process for recovering carbon dioxide from exhaust gases, the steps of: recovering by absorption the carbon dioxide contained in the exhaust gases by a liquid absorbing solution to form therewith a carbon dioxide saturated solution; boiling the saturated solution to effect final desorption and stripping of the carbon dioxide from the solution; and preheating the saturated solution to a temperature of the order of approximately 95° C. to 100° C. to effect preliminary stripping of carbon dioxide therefrom prior to the final boiling and stripping, by passing the saturated solution in heat exchange relation with both the boiled solution and the carbon dioxide-steam mixture resulting from the boiling.

6. In a process as defined in claim 5, effecting the step of final boiling of the pre-heated and partially stripped saturated solution, by direct introduction of steam into the solution.

7. In a process as defined in claim 5, effecting the step of final boiling of the pre-heated and partially stripped saturated solution, by indirect transfer of heat from steam to the solution.

8. In a process for recovering carbon dioxide from exhaust gases, the steps of: recovering by absorption the carbon dioxide contained in the exhaust gases by a liquid absorbing solution to form therewith a carbon dioxide saturated solution; boiling the saturated solution to effect final desorption and stripping of the carbon dioxide from the solution; passing the saturated solution in heat exchange relation with the stripped solution from the boiling step; and then passing the saturated solution in heat exchange relation with the carbon dioxide-steam mixture resulting from the boiling step to thereby raise the temperature of the preheated saturated solution to a temperature of approximately the order 95° C. to 100° C.

9. In a process for recovering carbon dioxide from exhaust gases, the steps of: recovering by absorption the carbon dioxide contained in the exhaust gases by an absorbing solution to form a carbon dioxide saturated solution; heating the carbon dioxide saturated solution to a temperature of the order of approximately 102° C. to 105° C. to boil the solution and effect desorption and stripping therefrom of the carbon dioxide; and preheating the saturated solution prior to the boiling thereof to a temperature of the order of approximately 95° C. to 100° C.

10. In a process for recovering carbon dioxide from exhaust gases, the steps of: recovering by absorption the carbon dioxide contained in the exhaust gases by a liquid absorbing solution to form a carbon dioxide saturated solution; heating the carbon dioxide saturated solution to a temperature of the order of approximately 102° C. to 105° C. to boil the solution to thereby effect desorption and final stripping of the carbon dioxide therefrom; and prior to the boiling of the saturated solution preheating such solution to a temperature of the order of 95° C. to 100° C. by passing the saturated solution in heat exchange relation with both the boiled solution and the carbon dioxide-steam mixture resulting from the boiling step.

11. In a process for recovering carbon dioxide from exhaust gases, the steps of: recovering by absorption the carbon dioxide contained in the exhaust gases by an absorbing solution to form a carbon dioxide saturated solution; boiling the saturated solution to effect desorption and final stripping therefrom of the carbon dioxide content thereof; and preheating the saturated solution prior to the boiling thereof to a temperature of the order of 95° C. to 100° C. by passing the saturated solution in heat exchange relation with the carbon dioxide-steam mixture resulting from the boiling of the saturated solution.

12. In a process for recovering carbon dioxide from exhaust gases, the steps of: absorbing from exhaust gases the carbon dioxide contained therein by an absorbing solution to form a carbon dioxide saturated solution; supplying steam to the saturated solution to boil the solution for desorption and final stripping therefrom of the carbon dioxide; preheating the saturated solution to a temperature of the order of approximately 95° C. to 100° C. to effect a preliminary desorption and stripping of carbon dioxide from the saturated solution prior to the final boiling thereof by heat exchange between the saturated solution and both the boiled solution and the carbon dioxide-steam mixture resulting from the boiling; passing a portion of the steam condensate resulting from the final boiling in heat exchange relation with the carbon dioxide-steam mixture from the final boiling to effect evaporation of such steam condensate; compressing vapor resulting from such evaporation; and discharging such compressed vapor for recovery of heat therefrom in the step of final boiling of the saturated solution.

13. In the process as defined in claim 12, discharging the compressed vapor in direct contact with the saturated solution.

14. In the process as defined in claim 12, discharging the compressed vapor into indirect heat exchange contact with the saturated solution.

15. In the process as defined in claim 12, effecting evaporation of the steam condensate by a step including heat exchange with the carbon dioxide-steam mixture resulting from the boiling in advance of passing said mixture in heat exchange with the saturated mixture.

16. In the process as defined in claim 12, effecting evaporation of the steam condensate by a step including heat exchange with the carbon dioxide-steam mixture resulting from the boiling after passing the boiled solution and the carbon dioxide-steam mixture in heat exchange with the saturated mixture.

17. In a process for recovering carbon dioxide from exhaust gases, the steps of: absorbing from exhaust gases the carbon dioxide therein by an absorbing solution to form a carbon dioxide saturated solution; heating the saturated solution to a temperature to effect boiling of the solution and desorption and final stripping therefrom of the carbon dioxide; recovering condensed vapors from the boiling step; evaporating such condensate by heat exchange with the vapors from the final stripping; compressing the vapors resulting from the evaporation of such condensate; and discharging the compressed vapors in heat exchange relation with the saturated solution for recovery of heat therefrom to effect boiling of the saturated solution.

18. In a process for recovering carbon dioxide from exhaust gases, the steps of: absorbing from the exhaust gases by a liquid absorbing solution the carbon dioxide in the gases to form a carbon dioxide saturated solution; heating the saturated solution by steam to a temperature to boil the solution to thereby effect final desorption and stripping therefrom of the carbon dioxide; recovering condensed vapors from the boiling step and then evaporating such condensate; compressing the vapors resulting from the aforesaid evaporation step; discharging the compressed vapors in heat exchange relation with the saturated solution to supply the recovered heat to the saturated solution in effecting the boiling of the solution; and passing the carbon dioxide steam mixture resulting from the boiling of the saturated solution in heat exchange relation with the vapors from the aforesaid evaporating step to thereby condense out the steam from the carbon dioxide-steam mixture.

19. In a process for recovering carbon dioxide from exhaust gases, the steps of: recovering from the exhaust gases by an absorbing solution the carbon dioxide to form a carbon dioxide saturated solution; heating the saturated solution in a steam boiler to a temperature to boil and thereby effect final desorption and stripping from the solution of the carbon dioxide; recovering condensed steam vapor from the boiling step and evaporating such condensate; compressing the vapor resulting from the evaporation of such condensate; discharging such compressed vapor into the steam boiler and utilizing the recovered heat content in effecting boiling of the saturated solution; and passing the mixture of carbon dioxide-steam vapor evolved from the saturated solution in the steam boiler in heat exchange relation with the evaporating steam condensate to condense out from the carbon dioxide-steam vapor mixture the steam content thereof.

20. In a process for recovering carbon dioxide from a carbon dioxide saturated absorbing solution, the steps of: heating the saturated solution by steam to a temperature to boil the solution and effect final desorption and stripping therefrom of the carbon dioxide; recovering condensate from the steam utilized to effect such boiling step and evaporating such condensate; compressing the steam vapor resulting from the aforesaid evaporation step; discharging the compressed steam vapor in heat exchange relation with the saturated solution for recovery of heat from the compressed steam vapor to aid in effecting boiling of the saturated solution; supplying additional steam to said boiler to insure maintenance of boiling temperatures in the saturated solution; and passing the carbon dioxide-steam vapor mixture evolved from the boiling of the saturated solution in heat exchange relation with the evaporating steam condensate in the aforesaid evaporating step, to thereby condense out the steam from the carbon dioxide in the carbon dioxide-steam mixture and enable recovery for utilization in the boiling step of the heat of condensation.

21. In a process for recovering carbon dioxide from a carbon dioxide absorbing solution, the steps of; heating the saturated solution by steam to a temperature to effect boiling of the solution for final desorption and stripping therefrom of the carbon dioxide; recovering condensate from the steam utilized in the aforesaid boiling step and evaporating such steam condensate; compressing the vapors resulting from the aforesaid evaporating step; and discharging such compressed vapor in heat exchange relation with the saturated solution to thereby furnish heat thus recovered from the boiling for utilization in effecting boiling of the saturated solution.

22. The process of claim 9 in which the preheating comprises subjecting the saturated solution to a heat exchange relationship with fluid heated by the boiling step.

23. The process of claim 12 including performing the step of evaporating said portion of the steam condensate while maintaining the pressure in the vapor lower than the partial pressure of the steam in the carbon dioxide-steam mixture which is being passed in heat exchange relation thereto.

24. A process according to claim 23 in which the pressure of said vapor from the steam condensate is maintained at least approximately 0.1 atmosphere below the partial pressure of said steam in the carbon dioxide-steam mixture.

25. The process of claim 19 including performing the step of evaporating the steam condensate from the boiler while maintaining the pressure in the vapor lower than the partial pressure of the steam in the carbon dioxide-steam mixture which is being passed in heat exchange relation thereto.

26. A process according to claim 25 in which the pressure in said vapor from the steam condensate is below atmospheric pressure.

27. A process according to claim 26 in which the pressure of said vapor from the steam condensate is maintained at least approximately 0.1 atmosphere below the partial pressure of the steam in the carbon dioxide-steam mixture.

References Cited in the file of this patent

UNITED STATES PATENTS

| Number | Name | Date |
|---|---|---|
| 3,688 | Hannen | Oct. 26, 1869 |
| 740,700 | Schlitz | Oct. 6, 1903 |
| 1,461,640 | Wirth-Frey | July 10, 1923 |
| 1,675,497 | Kelliher | July 3, 1928 |
| 1,900,655 | Metzger | Mar. 7, 1933 |
| 1,931,817 | Hogan et al. | Oct. 24, 1933 |
| 1,934,472 | Allen et al. | Nov. 7, 1933 |
| 2,021,937 | Johnstone | Nov. 26, 1935 |
| 2,043,109 | McKee | June 2, 1936 |
| 2,185,595 | Kleinschmidt | Jan. 2, 1940 |
| 2,185,989 | Roberts, Jr. | Jan. 2, 1940 |
| 2,263,688 | Allen et al. | Nov. 25, 1941 |
| 2,280,093 | Kleinschmidt | Apr. 21, 1942 |